(12) United States Patent
Inman et al.

(10) Patent No.: US 6,833,119 B1
(45) Date of Patent: Dec. 21, 2004

(54) VEHICLE POWER SUPPLY SYSTEM

(75) Inventors: Michael Inman, Abingdon (GB);
David Raybone, Gloucester (GB);
James Timothy Shawcross, Charlbury (GB)

(73) Assignee: Accentus PLC, Didcot (GB)

( * ) Notice: Subject to any disclaimer, the term of this patent is extended or adjusted under 35 U.S.C. 154(b) by 0 days.

(21) Appl. No.: 09/913,190

(22) PCT Filed: Feb. 21, 2000

(86) PCT No.: PCT/GB00/00603

§ 371 (c)(1),
(2), (4) Date: Aug. 13, 2001

(87) PCT Pub. No.: WO00/50246

PCT Pub. Date: Aug. 31, 2000

(30) Foreign Application Priority Data

Feb. 24, 1999 (GB) .............................. 9904069

(51) Int. Cl.[7] .............................................. B01J 19/08
(52) U.S. Cl. ..................... 422/186.04; 60/275
(58) Field of Search .................. 422/186.04; 60/275

(56) References Cited

U.S. PATENT DOCUMENTS

| | | | |
|---|---|---|---|
| 4,973,896 A | 11/1990 | Shiga | 322/28 |
| 5,247,808 A | 9/1993 | Yoshida | 62/228.4 |
| 5,822,981 A * | 10/1998 | Williamson et al. | 422/186.04 |
| 6,240,890 B1 * | 6/2001 | Abthoff et al. | 123/179.3 |

FOREIGN PATENT DOCUMENTS

| | | | |
|---|---|---|---|
| EP | 0057730 | | 8/1982 |
| EP | 0426345 | | 5/1991 |
| EP | 0 825 695 A | * | 2/1998 |
| GB | 1524127 | | 9/1978 |
| GB | 2 274 412 A | * | 7/1994 |
| JP | 07 253014 A | * | 10/1995 |
| WO | 94/10736 | | 5/1994 |
| WO | 98/07500 | | 2/1998 |

* cited by examiner

Primary Examiner—Kishor Mayekar
(74) Attorney, Agent, or Firm—William H. Holt

(57) ABSTRACT

A power supply and control system for a motor vehicle incorporating a plasma-assisted reactor for treatment of exhaust emissions and including a power source for supplying first and second output voltages.

10 Claims, 2 Drawing Sheets

VEHICLE POWER SUPPLY SYSTEM

This application is a 35 U.S.C. National Stage filing of PCT/GB00/00603 filed Feb. 21, 2000.

BACKGROUND OF THE INVENTION

The present invention relates to power supply systems and, more specifically to a power supply system for use with an automotive vehicle incorporating a reactor for the plasma-assisted treatment of the exhaust gases from its associated engine to reduce the emissions of one or more of nitrogenous oxides, particulate including carbonaceous particulate, hydrocarbons including polyaromatic hydrocarbons, carbon monoxide and other regulated or unregulated combustion products therefrom.

The principles of an arrangement for controlling corona discharge reactions in a corona discharge pollutant destruction apparatus employing one or more corona discharge reactors in a motor vehicle are described in U.S. Pat. No. 5,822,981. NOx, HC (hydrocarbon) and CO remaining in exhaust emissions emerging from the corona discharge reactor are sensed and a computer uses data from these sensors and other engine sensors to provide automatic control of power sources which supply the corona discharge reactors to adjust the power generation parameters to minimise the amount of pollutants in the treated gas. The power sources are, however, only shown indicatively in block diagrammatic form with no details of their components or how they are driven.

Modern motor vehicles include more and more electrical equipment, some of which, such as electronic braking, electronic valve timing and electrically operated power assisted steering systems consume considerable amounts of power and require heavy cables if the transmission power losses are to be kept to a reasonable level when operating with conventional 12 volt or 24 volt battery technology. It should be appreciated that in the automotive industry the principal battery technology is the lead-acid battery system with a nominal 12 volt output and open circuit voltage of 13.2 volts. The charging voltage required for a lead-acid battery is temperature-dependent but typically varies between 13.6–13.8 volts that is a nominal 14 volts due to the open circuit voltage of the battery. For the purposes of this specification we will use the industry adopted terminology of referring to battery voltages in multiples of the nominal 12 volts and to alternator outputs and charging voltages as multiples of the nominal 14 volts. As battery technology develops differing open circuit and charging voltages will apply and it will be it will be appreciated that the present invention is applicable to different battery voltages from those specifically referred to in the examples described in this specification. Power losses increase as the square of the electric currents flowing in the cables and vehicle manufacturers are considering the introduction of higher voltage standards such as 42 volts or 56 volts for charging of 36 volts and 48 volt batteries. In the interim period due to the large number of 12/14 volt systems in service dual voltage power systems are likely to be employed with two or more batteries allowing lower power demand equipment operating at twelve volts as at present and higher power demand equipment operating at thirty six, or even forty eight volts. This situation will be exacerbated when reactors for the plasma-assisted treatment of engine exhaust gases are fitted because such devices have a potential for high additional electrical power demand under certain engine load conditions.

Power requirements can be illustrated by the example in which applying 25 J per liter of exhaust gas flow to process the exhaust from a 250 kW truck engine at full rated power would require approximately 6.25 kW. While this represents an acceptable 2.5% of rated power, it presents a significant challenge as all of the power must be derived from the vehicle electrical power system. No single piece of electrical equipment on a vehicle today represents a challenge of this magnitude. Transmission of 6.25 kW at 12 volts involves currents of 521 amps whereas transmission at 36 volts requires 174 amps and at 48 volts, 130 amps. However, at higher voltages such as 72 or 96 volts, currents are lowered significantly to 87 amp and 65 amp respectively. It is desirable therefore to operate at the highest safe voltage when very high power loading is anticipated. It is generally recognised that operating voltages less than or equal to 50 volts are considered safe and acceptable on vehicles and this is driving the standard of 42 volts or 56 volts charging of 36 volt or 48 volt batteries discussed earlier. It can be seen however from the previous example that in some cases even higher voltages may be required to ensure efficient power transmission to potentially high power demand systems such as plasma assisted emission control. In addition vehicle applications based on use of three or even four output voltage sources in a vehicle are also of interest to motor manufacturers.

Unlike other vehicle power demands it is not necessary to run an emissions after treatment systems when there are no emissions from the vehicle, that is, when the engine is switched off and therefore there is no need to be able to operate the system from the conventional vehicle electrical supply incorporating the battery. An added benefit of this approach is that the absence of the battery in the circuit supplying the emissions control system enables less stringent regulation of voltage to be employed. An economic benefit, that is, lower cost can arise from this feature.

SUMMARY OF THE INVENTION

It is an object of the invention to provide a multiple-voltage power supply system for use in automotive vehicles, in particular in a power generation and supply system which is capable of powering plasma-assisted emissions control systems or other high power demand equipment, and in which, together with control functions, the problems of safe and efficient operation are addressed.

According to the invention there is provided a power supply system for a motor vehicle incorporating a reactor for the plasma assisted treatment of exhaust gases from an engine of the vehicle to remove noxious combustion products therefrom, a high voltage power supply adapted to produce an output voltage sufficient to produce a plasma in exhaust gases from the engine of the vehicle as they pass through the said reactor, an engine management system and a power management system adapted to monitor operating parameters of the engine (such as engine speed, throttle position, exhaust gas temperature, engine temperature), including the concentrations of the said noxious combustion products in the exhaust gases, characterised in that there is provided in combination a plural-voltage generator adapted to produce a first output voltage suitable for the operation of lower power demand electrical equipment of the vehicle and a second output voltage which is higher than the first output voltage, the said plural-voltage generator being connected to apply the second output voltage to the high voltage power supply which generates therefrom the said output voltage sufficient to produce a plasma in the exhaust gases, said engine and power management systems being adapted to monitor concentrations of noxious combustion products at both the inlet and outlet ports of the reactor, and to vary a control variable of the high voltage power supply so as to adjust the power supplied to the reactor to minimise the concentrations of the said noxious combustion products in the effluent from the reactor. In this way the overall processing efficiency of the system is increased.

In some situations it will not be possible or desirable to install on-board emissions monitoring of exhaust gas components. In these cases the existing engine sensors would be used to determine, via pre-programmed engine maps in the engine control unit, the levels of emissions for a given engine load/speed combination. In addition it will not always be possible or desirable to install a separate power management system and in such cases the hardware and software would be incorporated into the engine management system.

Preferably the plural-voltage generator is adapted to produce a second output voltage which is a multiple of the first output voltage.

Preferably the high voltage power supply includes an oscillator controlled by the engine and power management systems to adjust the power supplied to the reactor.

Preferably the high voltage power supply further includes a transformer to which the output of the oscillator is connected.

Preferably the first output voltage of the generator is a nominal 14 volts, and preferably the higher voltage output is produced as an alternating voltage the maximum values of which are symmetrically disposed with respect to ground potential.

The generator may be an alternator and the higher voltage is produced by a winding which is centre-tapped to ground so as to reduce the peak voltage by a factor of the square-root of three with respect to ground. For efficiency reasons it is preferable to run the voltage supply circuit to the transformer at the highest acceptable safe levels as this minimises power losses in cables and components. The booklet 'Memorandum of Guidance on the Electricity at Work Regulations' published by Health & Safety Executive, UK, 1990, page 21 suggests that safe operating voltages are 50 volts a.c. or 120 volts d.c. An additional benefit of running at the highest acceptable voltages is that size and weight of transformer are minimised as fewer windings are required due to the fact that the voltage step-up of the transformer is reduced.

In an alternative arrangement, the higher voltage output is produced as a d.c. voltage from one or more separate stator windings on the generator and in conjunction with a bridge rectifying circuit.

DETAILED DESCRIPTION OF THE INVENTION

Figure 1:
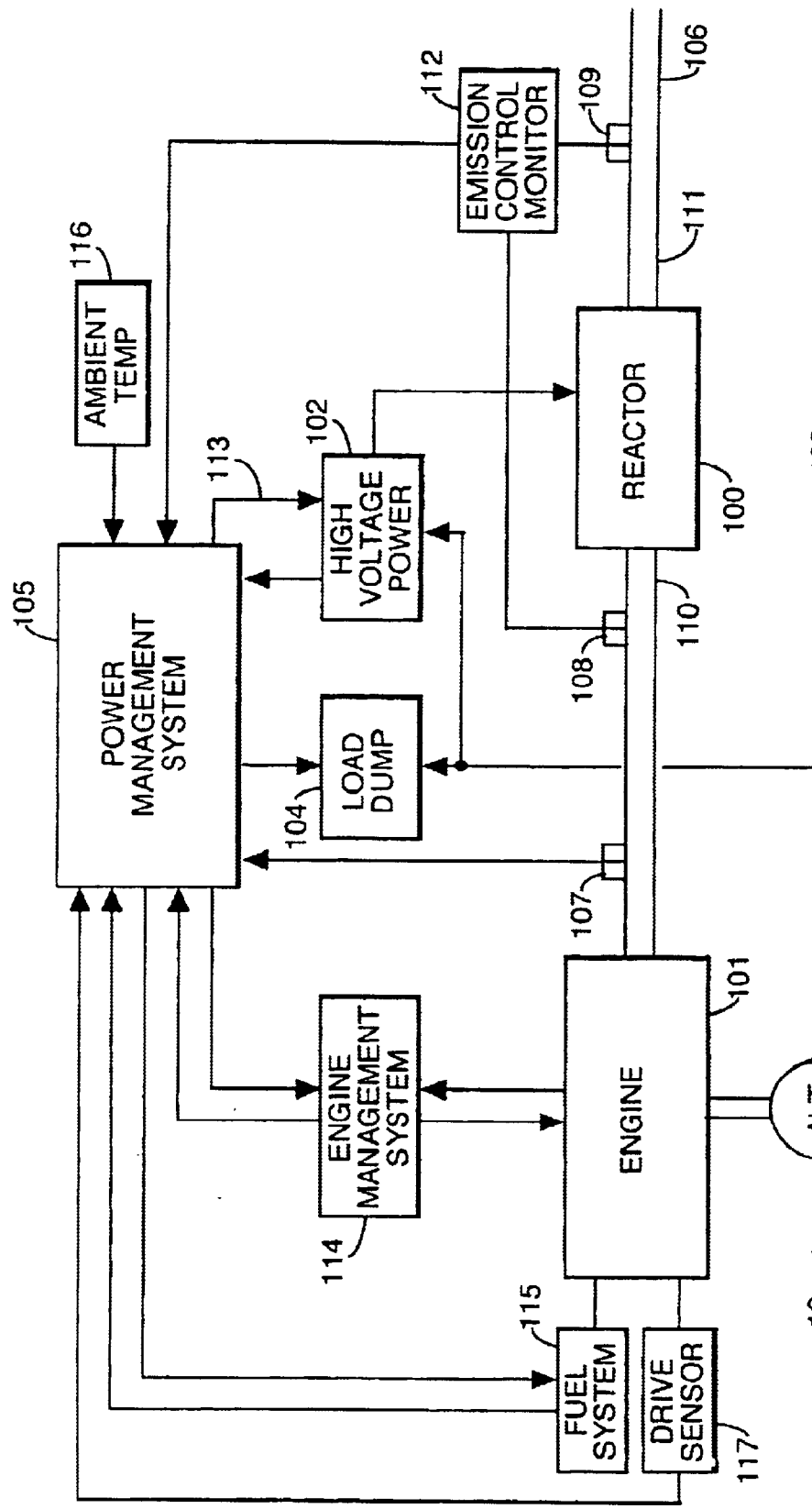
FIG. 1 is a schematic illustration of a power supply system including a reactor for treating exhaust gases from an internal combustion engine. For indicative purposes a nominal 12 volt battery circuit and a second output voltage of 100 volts is shown.
Figure 2:
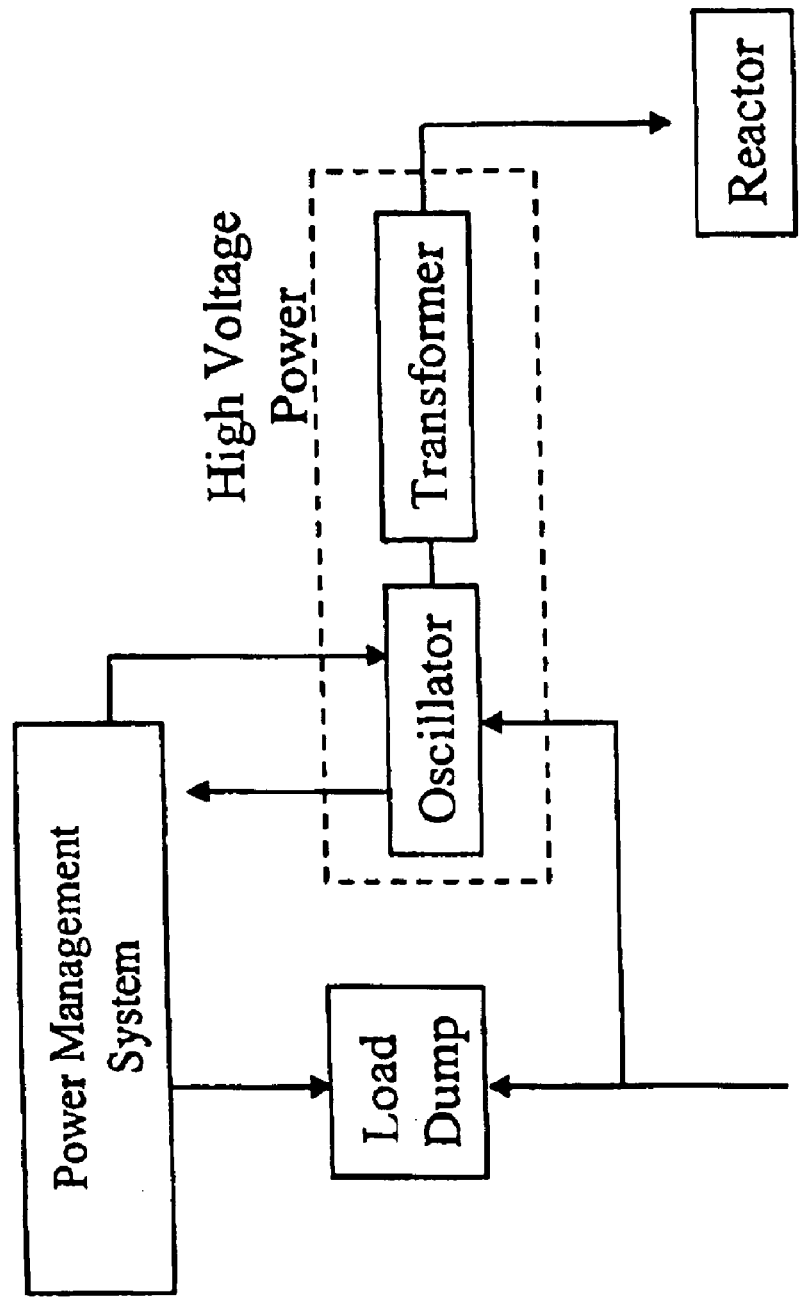
FIG. 2 illustrates the high voltage power as including an oscillator and a transformer.

Referring to the drawings, there is shown a power supply system for mobile applications such as a vehicle including a reactor 100 for the plasma assisted treatment of the exhaust gases from an internal combustion engine 101 which powers the vehicle. The reactor 100 is for the removal of noxious combustion products such as carbonaceous particulates and/or nitrogenous oxides from the exhaust gases. The reactor 100 may be a pellet bed reactor such as is described in our patent GB 2,274,412, a corona discharge reactor such as pulsed corona or continuous wave corona, a dielectric barrier reactor, a surface barrier reactor as described in our specification PCT/GB00/00079 or any other non-thermal or thermal reactor for the plasma assisted treatment of the exhaust gases from internal combustion engines to remove noxious combustion products therefrom and may include catalytic components or be installed as part of an emissions control system employing catalysts or other emission control devices.

The reactor 100 is connected to a high voltage power supply, 102, which in this example includes an oscillator and a transformer the oscillator being connected to the high voltage output terminals of a dual-voltage alternator 103 which is driven by the engine 101 of the vehicle. The reactor can be adjacent to its power supply as described in our publication WO99/05400 and the specification of our application PCT/GB00/00108. The alternator 103 is arranged to produce a first output voltage of for example fourteen volts or some other safe multiples for battery charging and hence to operate the basic electrical equipment of the vehicle such as the lights, wipers, in-car entertainment and so on, together with a second higher output voltage, which may be a multiple of the first voltage and is likely to be 84 volts or 112 volts. In addition to being applied to the high voltage power supply 102, containing for example an oscillator and a transformer the higher voltage output is available for use in operating other high power requirement equipment which does not require connection to a battery circuit. The high voltage line also is connected to a load dump 104, as is a power management system 105. The function of the load dump 104 is to absorb power transients which w&ay occur as a result of the switching of high power loads within the system.

In one embodiment a star wound alternator is used with the star point connected to the vehicle chassis. A full wave rectified output from the star point to either one of the positive or negative outputs of the bridge rectifier provides the basic charging voltage for the vehicle battery which can be for example 14 volts in current vehicles or 42 volts or higher in future vehicles. Under this operational mode an additional higher voltage output equal to the original voltage output multiplied by the square root of three (in this case 42 times the square root of three equals 71 volts) would be obtained between the positive and negative terminals of the full-wave bridge rectifier. This higher voltage could be used as a more efficient power source for higher power equipment. In a second embodiment where for example the equipment powered from the higher output voltage is more sensitive to ripple and therefore a higher voltage regulation is required, a star delta 12-pulse full-wave rectifier is used. This may have both star and delta stator windings providing identical voltage outputs for example the charging voltage of the vehicle. This second embodiment can provide three voltage outputs, the basic voltage, for example 42 volts between either polarity outputs of the full-wave rectifier and the chassis earth point. An output voltage of low ripple 84 volts between the two opposite polarity outputs of the full-wave rectifier suitable for powering the high-power demand equipment and a third output voltage would be available from the star point relative to the vehicle chassis, the latter voltage being the basic voltage divided by the square root of three, thus a nominal 24 volts from 42 volts. In a third embodiment the star and delta windings may be designed to give differing voltage outputs for example the star winding may provide the 42 volt output for battery charging whereas the combined output of the delta and star windings across the bridge rectifier can provide any other desired higher voltage. In this embodiment the highest voltage output is no longer limited to 84 volts and can be matched to the optimum voltage requirement for efficient operation of the vehicle equipment.

Attached to the exhaust pipe 106 of the vehicle engine 101 at the inlet 110 to and outlet 111 from the reactor 100, respectively, are sensors 107, 108 and 109 which in this example are used to measure the temperature of the exhaust gases from the engine 101, and the concentration in the exhaust gases of those noxious combustion products it is desired to remove from the exhaust gases. The exhaust temperature data are fed directly to the power management system 105. The noxious combustion products concentration data are fed to an emission control monitor 112 and thence to the power management system 105. The high voltage power oscillator 102 also is connected to the power management system 105 via a monitor/control link 113, as are an engine management system 114, and a fuel supply system 115. Also connected to the power management system are sensors 116 and 117, which measure the ambient temperature and the engine drive conditions respectively.

In use the power management system 105 controls the output power level from the high voltage power supply oscillator 102 from a minimum to a maximum as well as varying the duration of power pulses or other control variables, such as frequency or waveform in response to concentration level signals from the emission control monitor 112 and signals from the exhaust gas temperature sensor 107 and the ambient temperature sensor 116. The power management system 105 also monitors the operating state of the engine 101 via the engine management and fuel supply systems 114 and 115, respectively, so that the driving characteristics of the engine remain constant regardless of the demands made upon it by the power drawn by the reactor via the high voltage power supply unit 102 as it seeks to operate the reactor 100 so as to minimise the emission of the said noxious combustion products from the exhaust 106 from the engine 101 of the vehicle.

In a second embodiment not shown the hardware and software functions of the power management system 105 are contained within the vehicle engine management system 114 and all sensors and power connections originally connected to the power management system are connected directly to the engine control unit. In a third embodiment not shown the emissions control sensors 108, 109 and the emissions control monitor 112 are replaced by a pre-programmed engine map located within the engine management and power management systems. In this configuration signals from sensors such as 117 and 116 are used, together with the pre-programmed engine map, to determine the emissions level and hence the optimum control variables for the plasma after treatment system.

In a fourth embodiment an integrated starter alternator damper system an example of which is described in the article 'Stop go systems get the green light' in European Automotive Design, April 1998, pages 24–26 can be used to power a plasma assisted emissions control system.

In a fifth embodiment, for efficiency reasons, the high voltage power supply oscillator may be integral with the alternator 103. The power supply is adapted to produce pulses having a potential of the order of kilovolts to tens of kilovolts and repetition frequencies in the range 50 to 5000 Hz, although higher frequencies of the order of tens of kilohertz can be used. Pulsed direct current is convenient for automotive use, but alternating potentials for example triangular or sine waves of the same or similar characteristics can be used.

What is claimed is:

1. A power supply system for a motor vehicle incorporating a reactor for the plasma assisted treatment of exhaust gases from an engine of the vehicle to remove noxious combustion products therefrom, a high voltage power supply adapted to produce an output voltage sufficient to produce a plasma in exhaust gases from the engine of the vehicle as they pass through the said reactor, an engine management system and a power management system adapted to monitor operating parameters of the engine, including the concentrations of said noxious combustion products in the exhaust gases, wherein there is provided in combination a plural-voltage generator adapted to produce a first output voltage suitable for the operation of lower power demand electrical equipment of the vehicle and a second output voltage which is higher than the first output voltage and which is a multiple of the first output voltage, the said plural-voltage generator being connected to apply the second output voltage to the high voltage power supply which generates therefrom said output voltage sufficient to produce a plasma in the exhaust gases wherein the high voltage power supply includes an oscillator adapted to be controlled by the engine and power management system to adjust the power supplied to said reactor and a transformer to which the output of the oscillator is connected, said engine and power management system being adapted to monitor concentrations of noxious combustion products at both the inlet and outlet ports of the reactor, and to vary a control variable of the high voltage power supply for adjusting the power supplied to the reactor to minimize the concentrations of said noxious combustion products in the effluent from the reactor.

2. A power supply system according to claim 1, wherein the first output voltage of the generator is a nominal 14 volts.

3. A power supply system according to claim 1, wherein said second voltage output is produced as an alternating voltage the maximum values of which are symmetrically disposed with respect to ground potential.

4. A power supply system according to claim 3, wherein said second voltage is produced by a winding which is center tapped to ground for reducing the peak voltage by a factor of the square root of three with respect to ground.

5. A power supply system according to claim 1, wherein said second voltage output is produced as a d.c. voltage from one or more separate stator windings on the generator and in conjunction with a bridge rectifying circuit.

6. A power supply system according to claim 1, wherein the oscillator is directly coupled to said second voltage output from the generator.

7. A power supply system according to claim 1, wherein said generator comprises an integrated starter alternator damper system.

8. A power supply system according to claim 1, wherein said generator comprises an alternator driven by the engine and there is no battery in the circuit of the higher voltage output from the alternator.

9. A power supply system according to claim 8, wherein there is a battery in the circuit of the first output voltage of the alternator.

10. A power supply system according to claim 1, wherein said generator comprises an alternator driven by the engine.

* * * * *